United States Patent [19]
Cripe et al.

[11] Patent Number: 4,781,516
[45] Date of Patent: Nov. 1, 1988

[54] RAIL BOGIE HANDLING VEHICLE

[76] Inventors: Christopher A. Cripe, 1903 Escourt Dr., Coatesville, Pa. 19320; Alan R. Cripe, 4511 Menokin Rd., Richmond, Va. 23225

[21] Appl. No.: 16,205

[22] Filed: Feb. 18, 1987

[51] Int. Cl.[4] .............................................. B60P 3/06
[52] U.S. Cl. .................................... 414/555; 280/402; 294/104; 414/563
[58] Field of Search ............... 414/539, 540, 546, 563, 414/547, 551, 552-556; 280/402; 294/104, 82.31; 298/22 AE, 22 A; 212/187, 188

[56] References Cited

U.S. PATENT DOCUMENTS

| | | | |
|---|---|---|---|
| 2,682,957 | 7/1954 | Holmes | 212/188 |
| 3,109,676 | 11/1963 | Mercer | 294/82.31 |
| 3,238,587 | 3/1966 | Goinard | 294/82.31 X |
| 3,239,080 | 3/1966 | Corompt | 414/546 X |
| 3,256,042 | 6/1966 | Hunsaker | 298/22 AE |
| 3,311,401 | 3/1967 | Bacon | 294/82.31 X |
| 3,630,246 | 12/1971 | Hamilton | 414/546 X |
| 3,715,042 | 2/1973 | Rellinger | 280/402 X |
| 4,047,733 | 9/1977 | Parkes | 280/402 |
| 4,149,643 | 4/1979 | Skala et al. | 280/402 X |
| 4,360,230 | 11/1982 | Wood et al. | 294/82.31 X |
| 4,544,175 | 10/1985 | Hubert | 280/402 |

FOREIGN PATENT DOCUMENTS 1240735  6/1986  U.S.S.R. ............................ 414/546

*Primary Examiner*—Robert J. Spar
*Assistant Examiner*—David A. Bucci
*Attorney, Agent, or Firm*—Staas & Halsey

[57] ABSTRACT

A vehicle such as a conventional hostler tractor to which equipment has been added to enable the vehicle to also lift and move separable rail bogies. The added equipment includes a boom arm apparatus which is pivotally mounted to the tractor for movement from a stowed position adjacent the vehicle cab to a deployed position wherein it is resting upon and disposed across a fifth wheel coupling device of the tractor. The boom apparatus can be coupled to the rail bogie with a pick up shoe assembly, for example. Then, the boom apparatus can be lifted by elevating the fifth wheel coupling device so that the tractor can transport the rail bogie. When the vehicle is used to tow semitrailers, the boom apparatus can be lifted for example with a hydraulic cylinder, so as to be in its stowed position adjacent to the vehicle cab.

19 Claims, 3 Drawing Sheets

RAIL BOGIE HANDLING VEHICLE

BACKGROUND OF THE INVENTION

The present invention relates to "yard hostler" tractors for the short-distance movement of normal semi-trailers and, more particularly, to a "yard hostler" tractor which includes equipment so that the tractor is also capable of functioning as a rail bogie handling vehicle in conjunction with dual-mode rail-highway vehicle systems which employ separable rail bogies.

Yard hostler tractors are typically employed at truck and intermodal freight terminals, commonly known as "piggy-back" terminals, to position and/or move semi-trailers which are carried on railroad flat cars. Hostler tractors are used in this context to move trailers to and from parking areas and to locate the trailers near their intended position in the train. Large cranes are used to lift the trailers onto or off of flat cars which comprise the trains. Normally, hostler tractors are employed only within the confines of the terminal and adjacent areas because they are not capable of highway speeds. Further, these tractors are equipped with elevating fifth wheel devices so that trailers may be picked up and dropped off with high efficiency. More particularly, where an elevating fifth wheel is provided, the operator need not exit the cab of the vehicle in order to raise the landing gear of a semi-trailer being handled. Often an openable window or door is provided in the rear of the cab so that the driver can reach outside to connect the normal air brake lines between the tractor and trailer quickly.

Elevating fifth wheel devices on most hostler tractors are either pneumatically or hydraulically operated. The fifth wheel assembly is usually mounted on a forwardly-projecting beam pivoted to the frame of the vehicle adjacent the rear of the cab. Large air springs or hydraulic cylinders are interposed between the beam and the vehicle frame which, when activated, raise the rear of the beam and thus the fifth wheel above a normal or relaxed height. When a trailer is "hitched" on the fifth wheel, activation of the air springs or hydraulic cylinders lifts the nose of the trailer so that it may be moved without retracting its landing gear. On the other hand, when the proper destination is reached, the operator can lower the fifth wheel and thereby set the trailer again onto its landing gear, unlock the fifth wheel from the trailer king pin, disconnect the air brake lines and drive away.

Recently, dual-mode articulated rail-highway vehicle systems which employ separable rail bogies have been developed. In such a system, semi-trailer bodies which have retractable highway wheels are coupled to detachable rail bogies and the vehicles are then coupled end to end so as to form trains. No conventional rail cars are used in this system thereby reducing weight, cost and maintenance. However, as the rail bogies are left behind on the rail when the semi-trailer bodies are taken by normal tractors to their destinations over highway, the need has developed for a vehicle that can handle and transport rail bogies about the railway yard.

SUMMARY OF THE INVENTION

The invention described herein is equipment added to a conventional hostler tractor to enable such a vehicle to also lift and move rail bogies that are left behind on the rails in dual-mode rail-highway vehicle systems. More particularly, the present invention includes a boom arm which is pivotally mounted to the main frame rails of a conventional hostler tractor, adjacent the bottom of the back of the cab. The boom arm includes a main frame member which is pivotally mounted to the tractor at one end thereof and a jib arm member pivotally mounted to the other end of the main frame member. In the preferred embodiment, the main member and the tractor are further operatively coupled with a hydraulic cylinder or the like for raising and lowering the main member relative to the tractor. Further, the main member and jib arm are operatively coupled by a second hydraulic cylinder or the like for pivoting the jib arm relative to the main member. Finally, the distant-most end of the jib arm includes a coupler for coupling an associated rail bogie thereto. In view of the fact that hostler tractors are commonly provided at truck terminals and intermodal freight terminals, the addition of the bogie handling equipment of the present invention results in a dual-purpose vehicle at a relatively modest additional cost and complexity.

BRIEF DESCRIPTION OF THE DRAWINGS

Other objects, features, and characteristics of the present invention as well as the methods of operation and functions of the related elements of the structure, and the combination of parts and economies of manufacture, will become more apparent upon consideration of the following description and the appended claims with reference to the accompanying drawings, all of which form a part of this specification, wherein like reference numerals designate corresponding parts in the various figures, wherein:

DETAILED DESCRIPTION OF THE PRESENT PREFERRED EXEMPLARY EMBODIMENT

Figure 1:
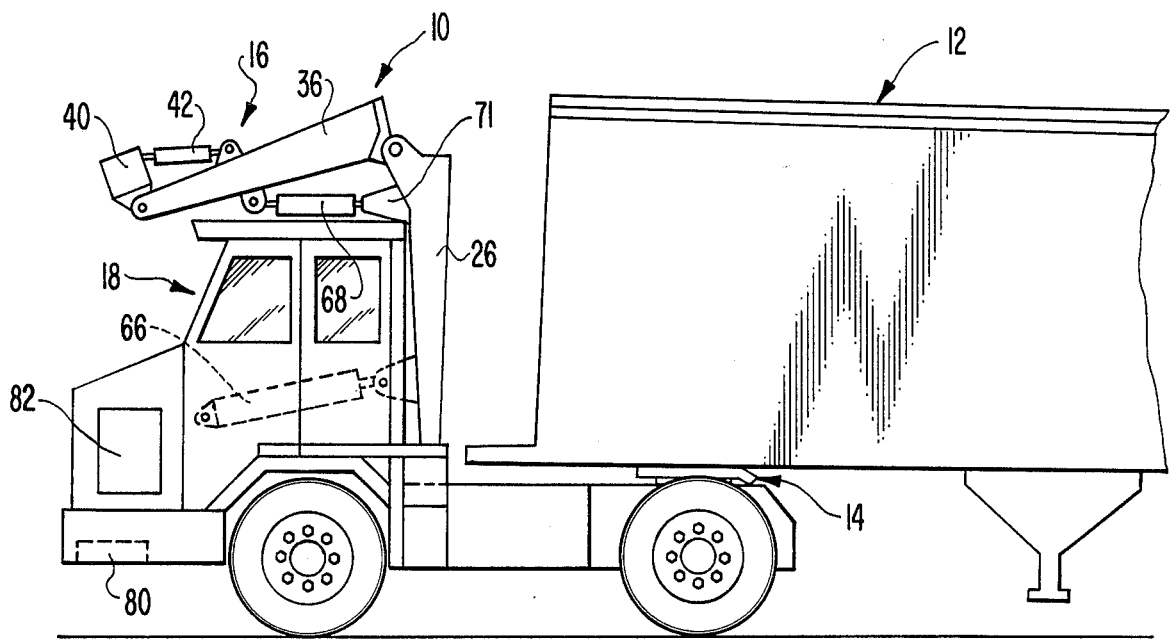
FIG. 1 is schematic side elevational view showing the bogie handling vehicle of the present invention in its normal, hostler tractor configuration.

FIG. 1 shows a bogie handling vehicle 10 formed in accordance with the present invention in the normal hostler tractor configuration with a trailer 12 coupled to fifth wheel 14 of tractor 10. In the illustrated configuration, fifth wheel 14 is in its non-elevated position. Further, the bogie handling device or "boom" shown generally as element 16 is elevated to its stored position behind and above cab 18 of vehicle 10 so as not to interfere with standard hostling operation.

Figure 2:
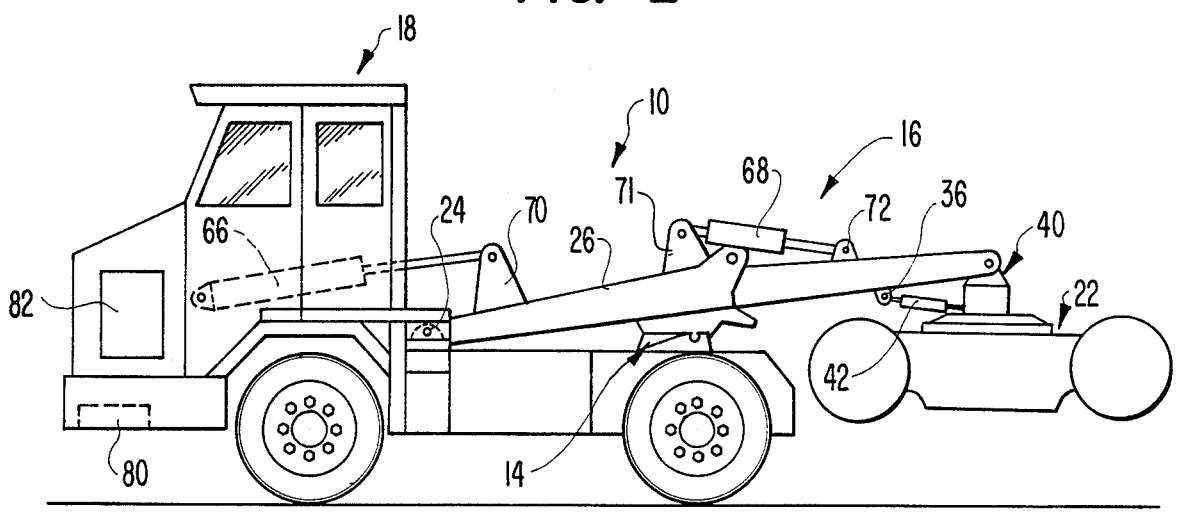
FIG. 2 is a schematic side elevational view showing the bogie handling vehicle of the present invention in its bogie handling configuration.

Turning now to FIG. 2, vehicle 10 is shown in its bogie handling mode. In this mode, boom 16 has been lowered hydraulically from its stored position, shown in FIG. 1, until it engages fifth wheel 14, the deployment or lowering operation to be described more fully below. After boom 16 has been lowered, vehicle 10 can be backed up until the pickup shoe 40 at end of boom 16 engages a center pin provided on an associated rail bogie (element 48 in FIG. 4). A pickup shoe 40 on boom 16 is employed to lock the center pin 48 of rail bogie 22 to permit lifting by boom 16, as will be described more fully with reference to FIG. 4, below. Tractor fifth wheel 14 is then raised either pneumatically or hydraulically, as described above. As fifth wheel 14 rises, it pushes upwardly on boom 16 which is pivotally mounted as at 24. This in turn lifts rail bogie 22 off the track. As can be seen, FIG. 2 shows tractor fifth wheel 14 in its elevated position. The operator can then drive vehicle 10 to another location, lower fifth wheel 14, unlock center pin 48 of rail bogie 22 from pickup shoe 40 and drive away. Boom 16 can be left in its lowered position if other rail bogies are to be moved or boom 16 can be raised hydraulically into its stored position (shown in FIG. 1) for normal trailer hostling, the raising operation to be described more fully below. All the controls for the aforementioned operation of the boom 16 are located in the vehicle cab 18 so that they may be easily operated by the driver.

Figure 3:
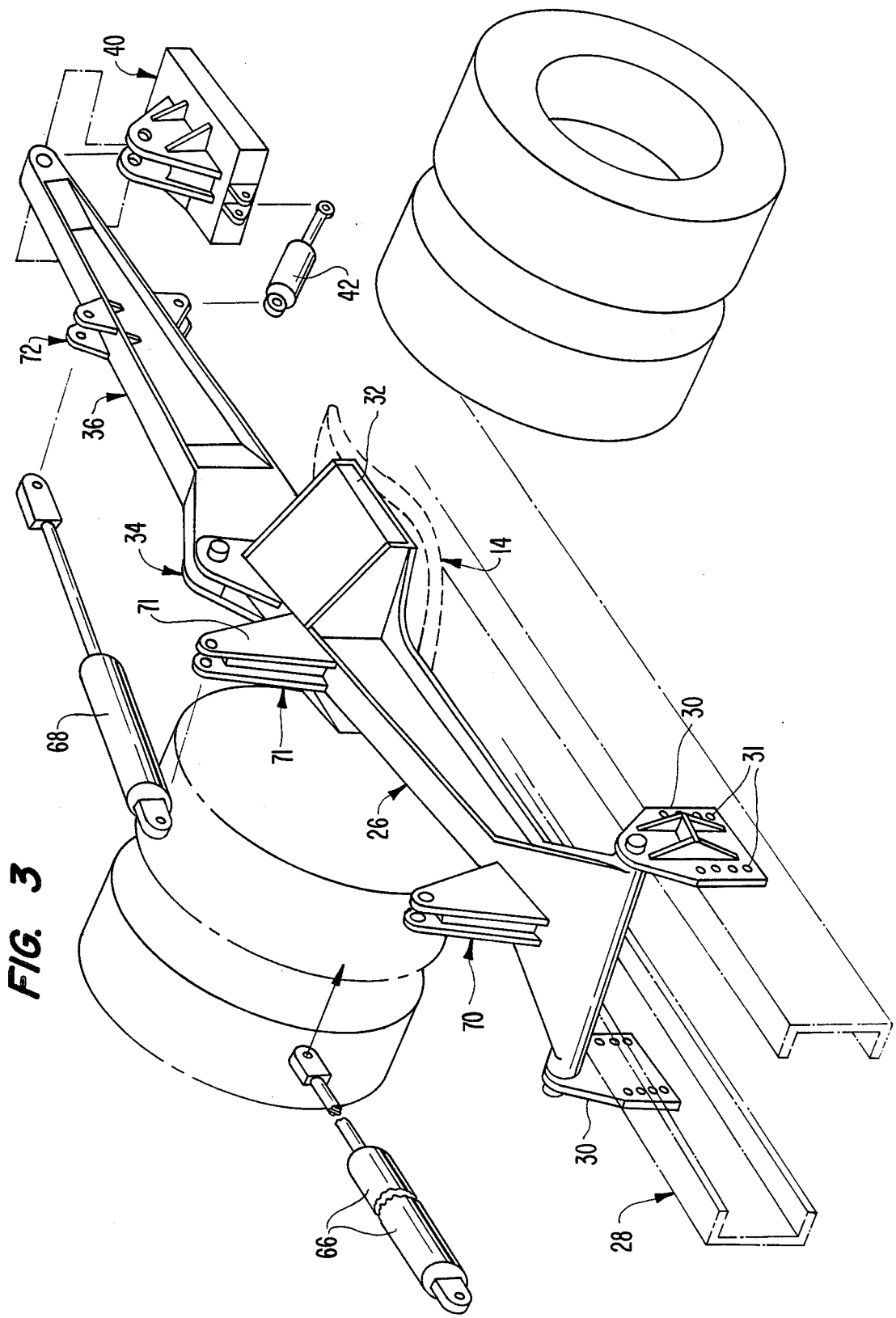
FIG. 3 is an exploded perspective view showing the bogie handling equipment of the present invention in greater detail.

Turning now to FIG. 3, boom 16 is composed of a main frame 26 which is pivotally mounted to the vehicle's main frame rails 28 (shown in phantom in FIG. 3) by means of brackets 30 which are suitably bolted or welded as at 31 to frame rails 28. Main frame 26 includes a transverse platen structure 32 at the end thereof opposite pivotal mounting 24, platen structure 32 serving to engage fifth wheel 14 when the boom 16 is deployed. A second pivotal connection 34 is provided atop platen structure 32 for pivotally mounting a jib arm 36 of boom 16. Second pivotal connection 34 is disposed so that jib arm 36 abuts against main frame 26 when boom 16 is in its deployed position so as to form a rigid structure when a downward load is present at the far end of jib arm 36. As can be seen in FIGS. 1 and 3 jib arm 36 is free to pivot relative to main frame 26 in the direction opposite to the deployed position (shown in FIG. 3) so that it may be stored as shown in FIG. 1.

Figure 4:
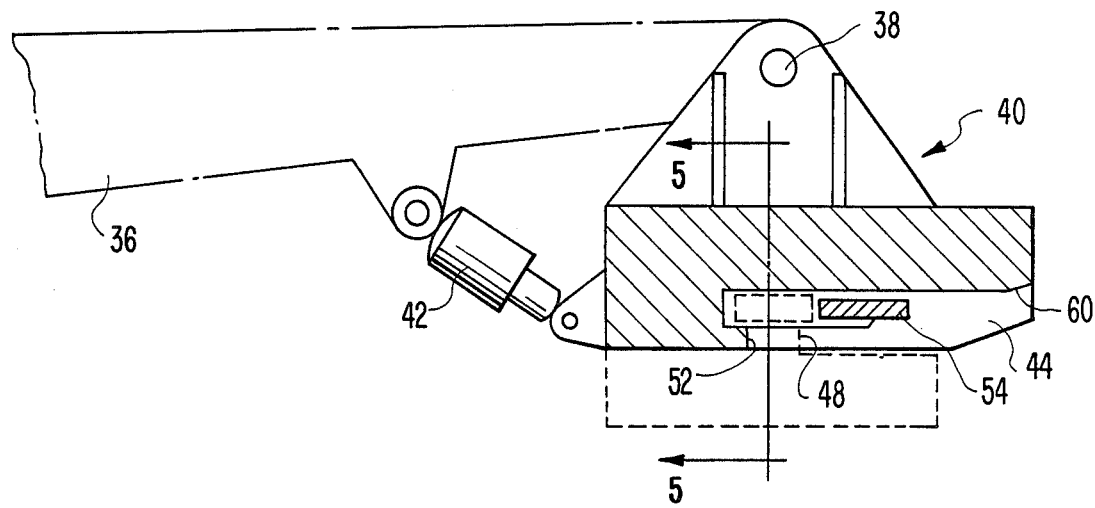
FIG. 4 is a side elevational view, partly in cross section, showing a pick up shoe assembly formed in accordance with the present invention.

The far end of jib arm 36 is provided with a pivot 38 to which a pickup shoe assembly 40 of boom 16 is attached. The movement of pickup shoe 40 relative to jib arm 36 is restricted by a hydraulic damper 42 as shown in FIGS. 3 and 4. This allows pickup shoe assembly 40, once attached to an associated rail bogie, to remain level as the boom is lifted. Further, hydraulic damper 42 serves to minimize swinging of the bogie 22 and pickup shoe 40 due to accelerations of vehicle 10 as it is driven.

Figure 5:
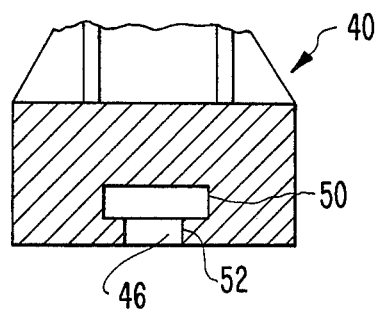
FIG. 5 is a view partly broken away for clarity, taken along line 5—5 of FIG. 4.
Figure 6:
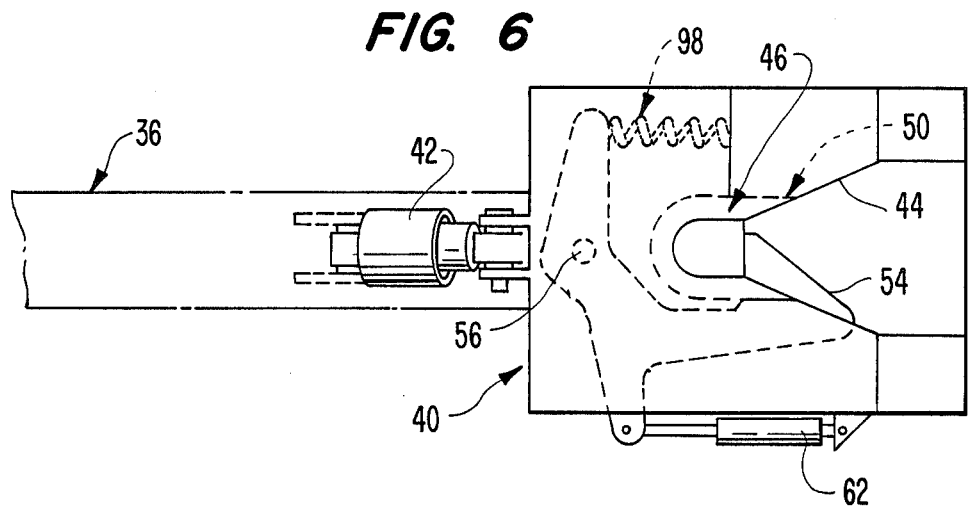
FIG. 6 is a bottom plan view of the pick up shoe of FIG. 4.

Turning now to FIGS. 4–6, pickup shoe assembly 40 is shown in greater detail. The lower surface of shoe assembly 40 is provided with a rearwardly opening throat passage 44 which terminates in a semi-circular slot 46 of slightly larger width than the diameter of body portion 49 of a center pin 48 (shown in phantom lines) of an associated rail bogie. Above the lower surface of the shoe assembly 40 is a second rearwardly-opening slot 50 of slightly larger width than the diameter of head 51 of the associated rail bogie center pin, as can be best seen in FIG. 5. Rearwardly-opening throat 44 and rearwardly-opening slot 50 together form a rearwardly-opening ledge 52 having dimensions so as to engage the body portion 49 and head 51 of the rail bogie center pin 48, as shown in FIG. 4. Ledge 52 thus serves to capture the head of the rail bogie center pin 48 so that the rail bogie may be lifted by boom 16.

Rail bogie center pin 48 is locked into pickup shoe assembly 40 by a pawl 54, as shown in FIG. 6. Pawl 54 is pivotally mounted to shoe assembly 40 as at 56. A spring 58 is interposed between pawl 54 and shoe assembly 40 so as to urge pawl 54 into its engaged position. In this position, pawl 54 captures the head of the rail bogie center pin 48, thereby locking the rail bogie to pickup shoe 40. The portion of pawl 54 extending into throat 44 is ramped at 60 so that, as the vehicle and hence the pickup shoe assembly 40 is backed up into engagement with the rail bogie center pin 48, pin 48 can enter throat 44 and force pawl 54 laterally, overcoming the force of pawl spring 58. Once the rail bogie center pin is fully engaged with the pickup shoe, pawl 54 will snap into engagement therewith under the force of spring 58.

A small pneumatic cylinder 62 is also operatively coupled to pawl 54. Pneumatic cylinder 62 is activated by controls (not shown) in the vehicle cab 18 to unlock pawl 54 when disconnecting vehicle 10 from a rail bogie 22. When pneumatic cylinder 62 is so activated, it overcomes the force of pawl spring 58 and hence moves pawl 54 out of throat 44. When pawl 54 is so displaced, forward motion of vehicle 10 will disengage pickup shoe 40 from the center pin.

Returning now to FIGS. 1 and 2, a ballast weight 80 is added to the front of the hostler tractor so as to complete the modifications thereof for same to become rail bogie handling vehicle. ballast weight 80 compensates for the cantilevered load on the rear of the vehicle when carrying a rail bogie, as is shown in FIG. 2. More particularly, ballast 80 is added to give a reasonable compromise between front and rear axle weight distribution in view of both operating modes. A small diesel engine is provided to drive an air compressor and the hydraulic pump for boom cylinders, which is shown generally as 82 in FIGS. 1 and 2. This is done to allow the vehicle main engine to idle under large compressed air or hydraulic demands during normal operations, conserving fuel and prolonging main engine life. Further, the small engine compressor pump 82 operates on demand to meet the air and hydraulic needs of the bogie handling vehicle.

Turning again to FIGS. 1–3, hydraulic cylinders 66 and 68 are used to deploy and retract boom main frame 26 and jib arm 36. Main frame 26 is provided with an upwardly-projecting bracket 70 to which a main frame hydraulic cylinder 66 is pivotally connected. The forward end of cylinder 66 is pivotally connected to the vehicle frame (not shown) to one side of vehicle cab 18 which is typically one third the width of the tractor. As can be seen in FIG. 1, when boom 16 is in its stored position, cylinder 66 (in phantom) is retracted and runs alongside vehicle cab 18. Jib arm hydraulic cylinder 68, which is best shown in FIGS. 2 and 3, is pivotally connected between projecting brackets 71 and 72 provided on boom main frame 26 and jib arm 36, respectively. Hydraulic cylinders 66 and 68 are operatively coupled to controls (not shown) located within vehicle cab 18 and are powered, by an engine driven hydraulic pump 82, previously described. The hydraulic control system is automatically sequenced for deployment and retraction as follows:

Initially, boom 16 is in its stored position adjacent the cab roof. When it is desired to deploy boom 16, main frame hydraulic cylinder 66 extends, lowering main frame 26 into engagement with tractor fifth wheel 14. After main frame 26 is lowered, jib arm hydraulic cylinder 68 extends, lowering jib arm 36 until it is fully extended against main frame 26. Cylinders 66 and 68 are then disabled (unpressurized) allowing tractor fifth wheel 14 to raise or lower boom 16 as required without encountering resistance from the hydraulic cylinders. When it is desired to retract boom 16 from its operative or deployed position, jib arm hydraulic cylinder 68 retracts, raising jib arm 36. When jib arm cylinder 68 is fully retracted, its control valve is closed so as to hydraulically lock jib arm 36 in its retracted position. Then main frame hydraulic cylinder 66 retracts, raising main frame 26 along with jib arm 36, attached thereto, into the stored position illustrated in FIG. 1. When main frame hydraulic cylinder 66 is fully retracted, its control valves close, hydraulically locking boom 16 in a stored position. The above-recited sequencing of hydraulic cylinders 66 and 68 minimizes the force required from same so that smaller cylinders sizes can be provided than might otherwise be necessary.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In combination with a tractor having a cab and an elevating fifth wheel type coupling device for towing a trailer, a boom apparatus for transporting separable rail bogies comprising:
    a main frame member mounted at a first end thereof to said tractor at a point intermediate a rearward face of said cab and said fifth wheel for pivotal movement from a stowed position adjacent and parallel to said rearward face to a deployed position;
    means for moving said main frame member at least from said stowed position to said deployed position;
    a jib arm member mounted at a first end thereof to a second end of said main frame member for pivotal movement from a stowed position substantially perpendicular to the said main frame member so as to be disposed adjacent and parallel to a roof of said cab to a deployed position;
    means for moving said jib arm member at least from said stowed position to said deployed position; and
    means for coupling said boom apparatus to a separable rail bogie, said means for coupling being disposed at a second end of said jib arm member,
    whereby when said main frame member and said jib arm member are in their respective deployed positions said boom apparatus extends across and rests on said fifth wheel so that said means for coupling to a separable rail bogie can be coupled to a rail bogie and said boom apparatus and the coupled rail bogie can be lifted by elevating said fifth wheel.

2. A boom apparatus as in claim 1, wherein said means for moving said main frame member and said means for moving said jib arm member comprise first and second hydraulic cylinder means, respectively, said first hydraulic cylinder being mounted at a first end thereof to said tractor and at a second end thereof to said main frame member, said second hydraulic cylinder means being mounted at a first end thereof to said main frame member and at a second end thereof to said jib arm member.

3. A boom apparatus as in claim 1, wherein said means for coupling are pivotally mounted to said jib arm member.

4. A boom apparatus as in claim 3, further comprising means for limiting the pivotal movement of said means for coupling relative said jib arm member.

5. A boom apparatus as in claim 1, wherein said means for coupling comprises a pick up shoe assembly including a rearwardly opening throat passage and a rearwardly opening slot which together form a rearwardly opening ledge having dimensions for engaging the body and head of a center pin disposed on an associated rail bogie such that when the tractor is backed towards the adjacent rail bogie, the rearwardly opening ledge captures the head of the center pin of the rail bogie, whereby the rail bogie can be lifted by the boom assembly.

6. A boom apparatus as in claim 1, wherein said means for coupling include means for locking a center pin of an associated rail bogie thereto.

7. A boom apparatus as in claim 5, wherein said pick up shoe assembly includes means for locking the center pin of a rail bogie in said rearwardly opening slot.

8. A boom apparatus as in claim 7, wherein said means for locking comprise a pawl element pivotally mounted to a main portion of said shoe assembly and a spring means coupled to said pawl element and said main portion for urging a portion of said pawl into said rearwardly opening slot to engage and lock a rail bogie center pin within said pick up shoe assembly.

9. A boom assembly as in claim 8, wherein the portion of said pawl which extends into said rearwardly opening slot includes a ramped rearward face so that as the towing vehicle is backed up to engage said pick up shoe assembly with a rail bogie center pin, the pin can enter the rearwardly opening slot and force said pawl laterally, whereby, once the rail bogie's center pin is fully engaged with the pick up shoe, said pawl will snap into engagement therewith and lock same within the pick up shoe assembly.

10. A vehicle comprising:
    a tractor body including at least first and second axles each having at least first and second wheels;
    a cab having a rearward face disposed on a forward end of said tractor body;
    an elevating fifth wheel coupling device for coupling to a semitrailer mounted to a rearward portion of said tractor body;
    a boom apparatus having a first end and a second end;
    said boom apparatus pivotally mounted at said first end thereof to said tractor body at a point intermediate said rearward face of said cab and said fifth wheel coupling device;
    said boom apparatus having a stowed position adjacent and parallel to said cab whereby said fifth wheel coupling device is free to be coupled to a semitrailer and a deployed position wherein said boom apparatus rests upon and extends across said fifth wheel coupling device;
    means for pivotally moving said boom apparatus from said stowed position to said deployed position; and
    means mounted to a second end of said boom apparatus for coupling said boom apparatus to a separable rail bogie,
    whereby, when said boom apparatus is in said deployed position, said means for coupling can be coupled to a separable rail bogie and said fifth wheel coupling device can be elevated to elevate said boom apparatus and lift said rail bogie.

11. A vehicle as in claim 10, wherein said boom apparatus comprises:
   a main frame member mounted at a first end thereof to said tractor body for pivotal movement from a stowed position adjacent and parallel to said rearwood face of said cab to a deployed position;
   a jib arm member mounted at a first end thereof to a second end of said main frame member for pivotal movement from a stowed position substantially perpendicular to the said main frame member so as to be disposed adjacent and parallel to a roof of said cab to a deployed position;
   said means for moving said boom apparatus comprising means for moving said main frame member at least from said stowed position to said deployed position and means for moving said jib arm member at least from said stowed position to said deployed position; and said means for coupling said boom apparatus to a separable rail bogie are mounted to a second end of said jib arm member,
   whereby when said main frame member and said jib arm member are in their respective deployed positions said boom apparatus extends across and rests on said fifth wheel.

12. A vehicle as in claim 11, wherein said means for moving said main frame member and said means for moving said jib arm member comprise first and second hydraulic cylinder means, respectively, said first hydraulic cylinder means being pivotally mounted at a first end thereof to said tractor and at a second end thereof to said main frame member, said second hydraulic cylinder means being pivotally mounted at a first end thereof to said main frame member and at a second end thereof to said jib arm member.

13. A vehicle as in claim 12, wherein said means for coupling are pivotally mounted to said jib arm member.

14. A vehicle as in claim 13, further comprising means for limiting the pivotal movement of said means for coupling relative to said jib arm member.

15. A vehicle as in claim 14, wherein said means for limiting comprise hydraulic damper means pivotally mounted at a first end thereof to said jib arm member and at a second end thereof to said means for coupling.

16. A vehicle as in claim 13, wherein said means for coupling comprises a pick up shoe assembly including a rearwardly opening throat passage and a rearwardly opening slot which together form a rearwardly opening ledge having dimensions for engaging the body and head of a center pin disposed on an associated rail bogie such that when the vehicle is backed towards the adjacent rail bogie, the rearwardly opening ledge captures the head of the center pin of the rail bogie, whereby the rail bogie may be lifted by the boom assembly.

17. A vehicle as in claim 16, wherein said pick up shoe assembly includes means for locking the center pin of a rail bogie in said rearwardly opening slot.

18. A vehicle as in claim 17, wherein said means for locking comprise a pawl element pivotally mounted to a main portion of said shoe assembly and a spring means coupled to said pawl element and said main portion or urging a portion of said pawl into said rearwardly opening slot so as to engage and lock a rail bogie center pin within said pick up shoe assembly.

19. A vehicle as in claim 18, wherein the portion of said pawl which extends into said rearwardly opening slot includes a ramped rearward face so that as the vehicle is backed up to engage said pick up shoe assembly with a rail bogie center pin, the pin can enter the rearwardly opening slot and force said pawl laterally, whereby, once the rail bogie's center pin is fully engaged with the pick up shoe, said pawl will snap into engagement therewith and lock same within the pick up shoe assembly.

* * * * *